United States Patent [19]

Hosoi

[11] Patent Number: 5,052,078

[45] Date of Patent: Oct. 1, 1991

[54] HINGE MECHANISM FOR PORTABLE ELECTRONIC APPARATUS

[75] Inventor: Takashi Hosoi, Tokyo, Japan

[73] Assignee: Kabushiki Kaisha Toshiba, Kawasaki, Japan

[21] Appl. No.: 633,197

[22] Filed: Dec. 31, 1990

Related U.S. Application Data

[63] Continuation of Ser. No. 542,784, Jun. 26, 1990, abandoned, which is a continuation of Ser. No. 90,279, Aug. 28, 1987, abandoned.

[30] Foreign Application Priority Data

Aug. 29, 1986 [JP] Japan .......................... 61-131357[U]

[51] Int. Cl.$^5$ ............................................ E05D 11/10
[52] U.S. Cl. ........................................ 16/297; 16/303; 16/308; 16/321; 16/341; 16/342; 16/386; 364/708; 218/292.1; 358/254
[58] Field of Search .......................... 16/280, 284–285, 16/297, 303, 308, 332–333, 339, 341–342, 386; 296/97.4, 97.9, 97.13, 97.12; 364/708; 248/917, 921–923, 292.1; 358/254

[56] References Cited

U.S. PATENT DOCUMENTS

| | | | |
|---|---|---|---|
| 1,742,699 | 1/1930 | Fellows ................................. | 16/386 |
| 2,304,223 | 12/1942 | Westrope ............................... | 16/386 |
| 4,070,054 | 1/1978 | Cziptschirsch ...................... | 296/97.9 |
| 4,702,513 | 10/1987 | Ebert et al. ......................... | 296/97.9 |
| 4,734,955 | 4/1988 | Connor ................................. | 16/342 |

FOREIGN PATENT DOCUMENTS

| | | | |
|---|---|---|---|
| 140222 | 8/1982 | Japan .................................. | 296/97.9 |
| 1354485 | 5/1974 | United Kingdom ............. | 296/97.12 |
| 2154192 | 9/1985 | United Kingdom ............. | 296/97.12 |

*Primary Examiner*—Richard K. Seidel
*Assistant Examiner*—Edward A. Brown
*Attorney, Agent, or Firm*—Foley & Lardner

[57] ABSTRACT

A portable electronic apparatus has a body portion with a keyboard on a front upper part thereof, and a display portion which is connected to a higher position at the rear of the body portion through a hinge portion such that the display portion is folded down and pulled up with respect to the body portion. The display portion is provided with a large-sized display screen such as a liquid crystal display (LCD) on a front surface thereof. The hinge portion comprises a hinge member which is disposed in a recess formed on the body portion and divided into a hinge cover and a hinge base; a pair of hinge shafts projecting from both upper ends of the hinge member and whose projecting ends are connected to the bottom of the display portion; presser spring disposed in the hinge member, each engaging with the corresponding hinge shaft to restrict the pivotal movement of the hinge shaft; torsion bars disposed on both lower sides of the hinge member; and supporting portions provided on side faces of the body portion and to which the torsion bars are fitted. Each of the hinge shafts has an elliptic section at least at a portion engaging with the presser spring so that a deflection quantity of the presser spring is automatically adjusted.

15 Claims, 5 Drawing Sheets

HINGE MECHANISM FOR PORTABLE ELECTRONIC APPARATUS

This application is a continuation of application Ser. No. 07/542,784, filed June 26, 1990 now abandoned, which is a continuation of Ser. No. 07/090,279, filed Aug. 28, 1987 now abandoned.

BACKGROUND OF THE INVENTION

1. Field of the Invention

The present invention relates to a portable electronic apparatus having a body portion and a display portion which is connected to the body portion through a hinge mechanism such that the display portion is folded down and pulled up with respect to the body portion, and particularly to a hinge mechanism which enables an angle of the display portion to be adjusted with constant force.

2. Description of the Prior Art

In a portable personal computer or a portable word processor, a thin display portion provided with a large-sized display screen such as a liquid crystal display (LCD) is connected to a body portion such that the display is folded over a keyboard of the body portion and pulled up therefrom. To carry the apparatus, the display portion is folded down to provided an attache-case-like appearance, and, to use the same, the display portion is pulled up and positioned behind the keyboard.

A typical example of a conventional portable electronic apparatus is shown in FIGS. 1 and 2. FIG. 1 is a side view showing an open position and a closed position of the conventional portable electronic apparatus, and FIG. 2 is an enlarged side view showing a hinge shaft of the apparatus shown in FIG. 1.

As shown in FIG. 1, the conventional portable electronic apparatus has a body portion 1 to which a display portion 3 is connected through a hinge portion 4 such that the display portion 3 is folded down and pulled up with respect to the body portion 1. The display portion 3 is journaled to the body portion 1 through a hinge shaft 440 of the hinge portion 400.

As shown in FIG. 1, when the apparatus is not used, the display portion 3 is positioned at "A" to cover a keyboard 2 of the body portion 1 so that the apparatus may provide a compact appearance to easily be stored and carried and protect the display portion 3 as well as the keyboard 2.

To use the apparatus, an angle of the display portion 3 is properly adjusted through the hinge shaft 440.

It is required that the angle of the display portion 3 is continuously adjusted within the range of angle θ from Y to X shown in FIG. 1 to keep the display portion 3 at an optional angle. To achieve such an adjustment, the hinge shaft 440 is pressed, as shown in FIG. 2, by a presser spring 450 with constant force so that frictional force between the hinge shaft 440 and the presser spring 45 may keep the display portion 3 at the optional angle.

However, according to the conventional portable electronic apparatus with the above-mentioned arrangement, the angle of the display portion 3 is adjusted by utilizing the frictional force which is always constant, between the hinge shaft 440 and the presser spring 450. Therefore, a moment derived, from the product of the weight and the position of the center of gravity of the display portion 3 changes as the angle θ varies. Due to this, force to be applied to the display portion 3 to change the angle thereof increases and decreases.

Namely, the moment will be maximized when the display portion 3 takes a horizontal position X, and will be zeroed when the display portion 3 takes an upright position Y. Therefore, in adjusting the angle of the display portion 3, an operator shall apply stronger force as the display portion 3 approaches the position Y, and weaker force as the display portion 3 approaches the position X. In this way, the operator is subjected to bothersome work to reduce or increase his force to be applied to the display portion 3, and, therefore, a commercial value in terms of operability of the apparatus may be degraded.

Further, with the above-mentioned arrangement, the presser spring 450 shall always tighten the hinge shaft 440 with force which is larger than the maximum moment so that its reaction may be applied to a plastic boss 421 of a hinge base 420 to cause creep and deteriorate the durability and the reliability of the hinge portion 400.

SUMMARY OF THE INVENTION

The present invention is to solve the problems inherent to the conventional portable electronic apparatus mentioned in the above.

An object of the present invention is to provide a hinge mechanism for a portable electronic apparatus, which has an excellent operability in adjusting the angle of a display portion of the apparatus.

Another object of the present invention is to provide a hinge mechanism for a portable electronic apparatus, which enables the angle of a display portion of the apparatus to be adjusted to an optional angle with constant force.

The other object of the present invention is to provide a hinge mechanism for a portable electronic apparatus, which has an excellent durability and reliability.

A feature of the present invention resides in a portable electronic apparatus having a body portion and a display portion connected to the body portion through a hinge portion such that the display portion is folded down and pulled up with respect to the body portion. The hinge portion comprises a hinge member whose upper part supports a lower end of the display portion, a pair of hinge shafts each having an elliptic cross section, presser spring engaged with the hinge shafts to control the pivotal movement thereof, torsion bars pivotably inserted into both lower sides of the hinge member, and supporting portions to which the torsion bars are engaged. When the display portion is brought to an upright position, a minor diametral portion of the hinge shaft contacts the presser spring, and, when the display portion is brought to a horizontal position, a major diametral portion of the hinge shaft contacts the presser spring.

Each of the hinge shafts of the portable electronic apparatus according to the present invention has an elliptic cross section at least at a portion contacting the corresponding presser spring. When the display portion is brought to the horizontal position at which the maximum moment is applied to the hinge shaft, the major diametral portion of the hinge shaft contacts the presser spring to increase a deflection quantity of the presser spring. When the display portion is brought to the upright position at which the minimum moment is applied to the hinge shaft, the minor diametral portion of the hinge shaft contacts the presser spring to decrease the deflection quantity of the presser spring. With such an arrangement, an angle of the display portion is adjusted by an operator with constant force to be applied to the display portion, and force to be applied to a boss portion of a hinge base will be constant to prevent a creep from being caused at the hinge portion.

These and other objects, features and advantages of the present invention will become apparent from the following description of a preferred embodiment taken in conjunction with the accompanying drawings.

DESCRIPTION OF THE PREFERRED EMBODIMENTS

Figure 1:
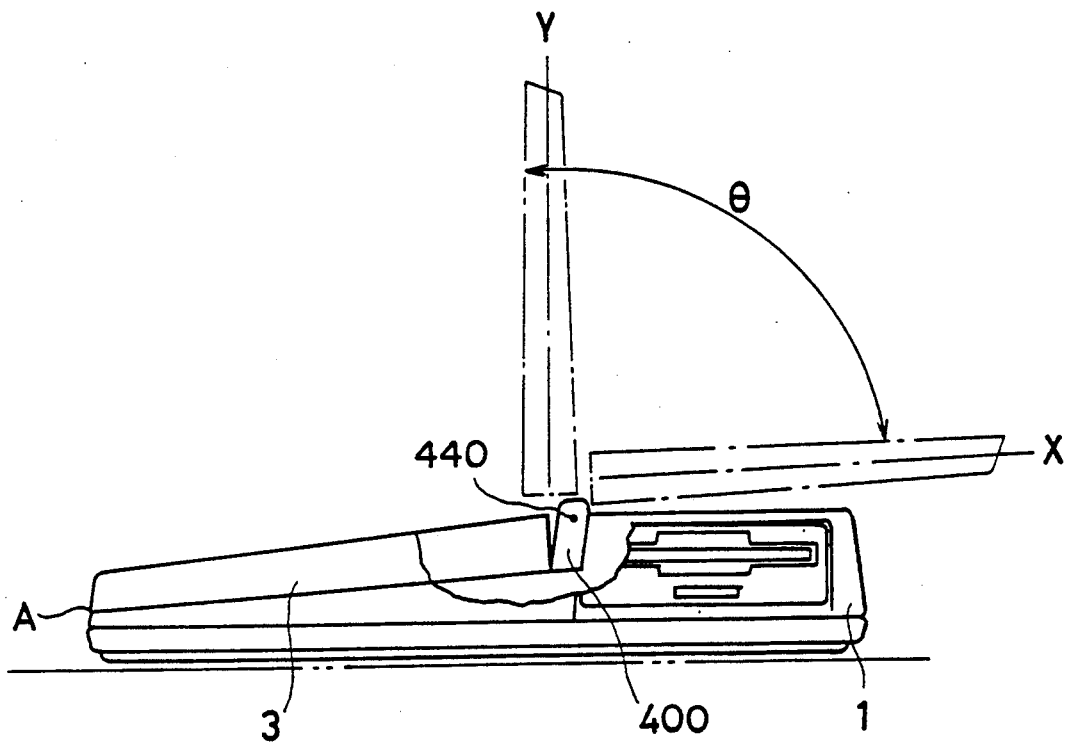
FIG. 1 is a side view showing a conventional portable electronic apparatus with a display portion at an open position and at a closed position.
Figure 2:
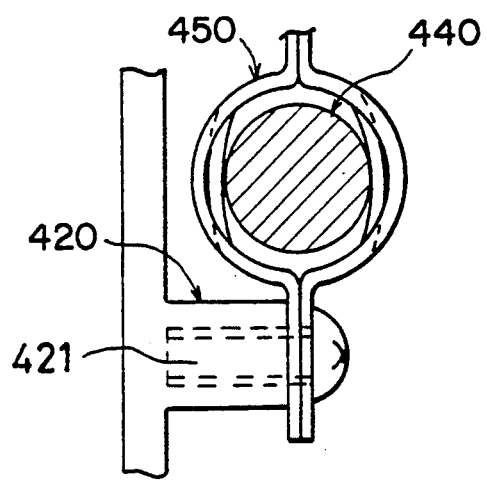
FIG. 2 is an enlarged section showing a hinge shaft portion of the conventional portable electronic apparatus shown in FIG. 1.
Figure 3:
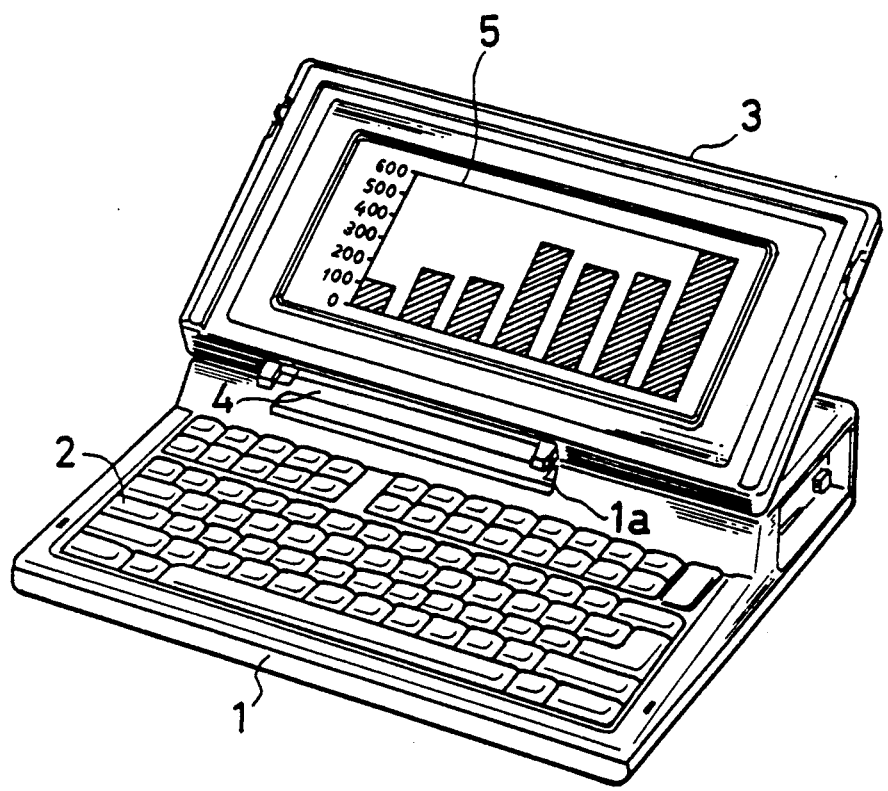
FIG. 3 is a perspective view showing an assembled portable electronic apparatus according to the present invention.
Figure 5:
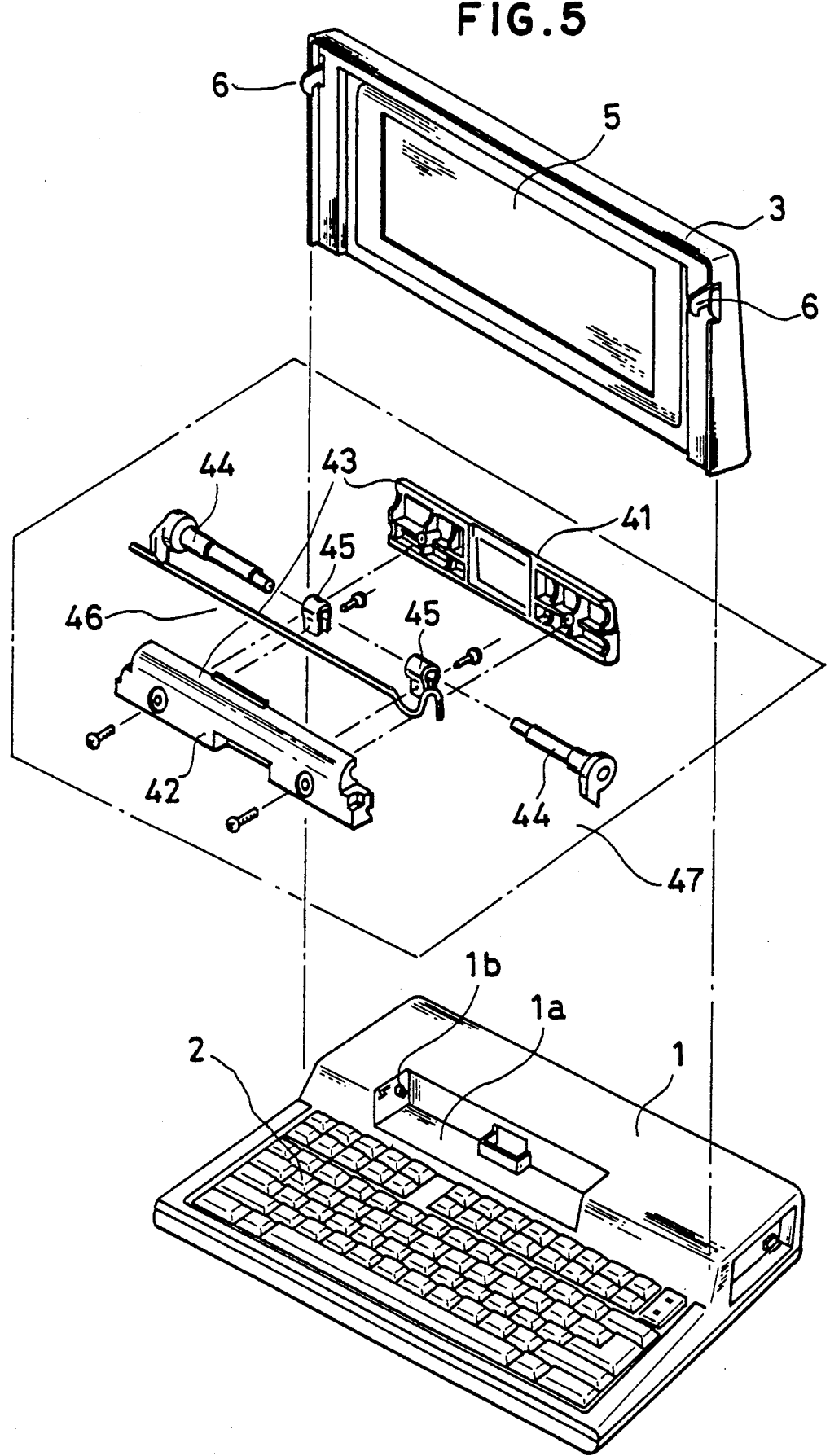
FIG. 5 is an exploded perspective view showing the electronic apparatus shown in FIG. 3.

FIG. 3 is a perspective view showing an assembled portable electronic apparatus according to the present invention, and FIG. 5 an exploded perspective view showing the electronic apparatus shown in FIG. 3.

The portable electronic apparatus according to the present invention has a body portion 1 with a keyboard 2 which is disposed on a front upper portion of the body portion 1, and a display portion 3 which is connected to a higher position at the rear of the body portion 1 through a hinge portion 47 such that the display portion 3 is folded down and pulled up with respect to the body portion 1. The display portion 3 is provided with a large-sized display screen 5 such as a liquid crystal display (LCD) on a front surface of the display portion 3.

The hinge portion 47 comprises a hinge member 43 which is disposed in a recess 1a formed on the body portion 1 and divided into a hinge cover 41 and a hinge base 42; a pair of hinge shafts 44 projecting from both upper ends of the hinge member 43 and whose projecting ends are connected to a bottom surface of the display portion 3; presser spring 45 disposed in the hinge member 43 and engaged with corresponding hinge shafts 44 to restrict the pivotal movement of the shafts 44; torsion bars 46 (only one is shown in the figures) disposed on both lower sides of the hinge member 43; and supporting portions 1b provided on side faces of the body portion 1 and to which the torsion bars 46 are fitted respectively.

Each of the hinge shafts 44 has an elliptic section at least at a portion engaging with the corresponding presser spring 45 so that a deflection quantity of the presser spring 45 is automatically adjusted.

With reference to FIGS. 4 to 7, an opening and closing mechanism of the display portion 3 of the portable electronic apparatus according to the present invention will be described.

Figure 4:
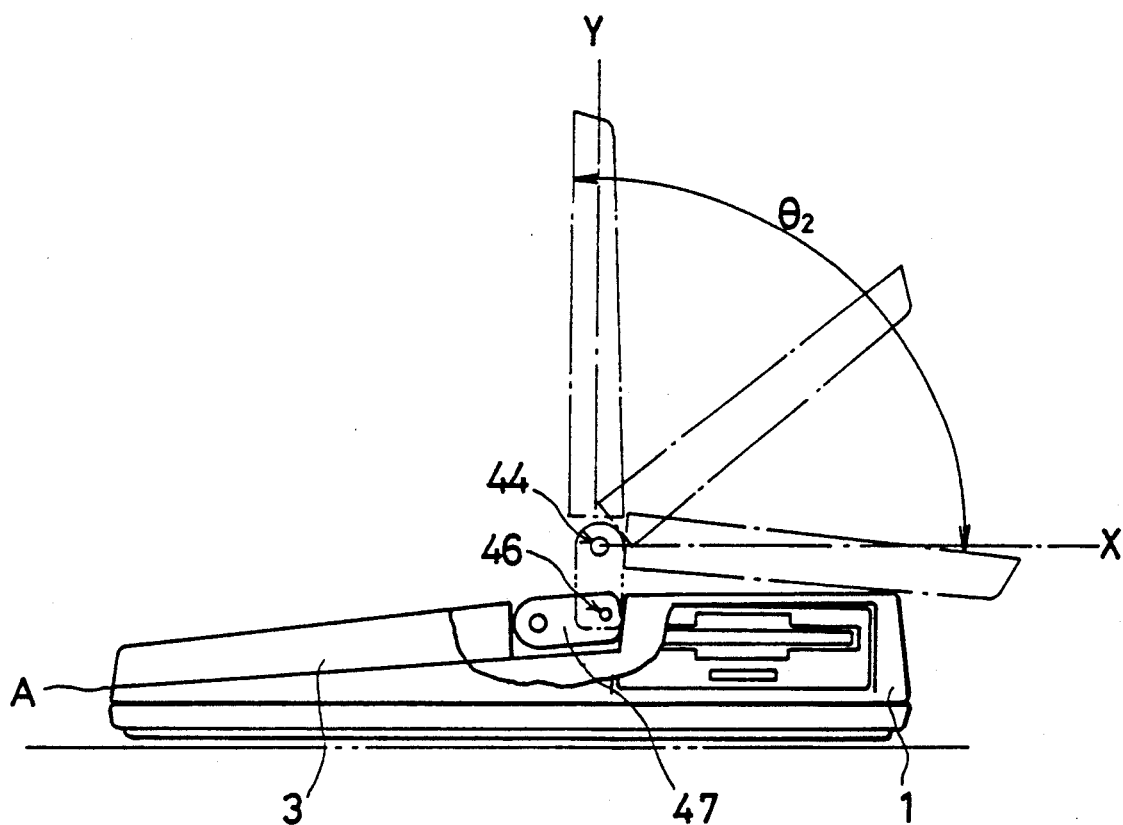
FIG. 4 is a side view showing the electronic apparatus shown in FIG. 3.

When the portable electronic apparatus is not used, the display portion 3 is positioned at "A" shown in FIG. 4 to cover the keyboard 2 of the body portion 1.

To use the apparatus, the display portion 3 together with the hinge portion 47 are pivoted around the torsion bars 46 to bring the apparatus to an upright position Y shown in FIG. 4. When the display portion 3 reaches the point Y, the torsion bars 46 are fixed and locked by the action of supporting brackets, etc.

After that, the display portion 3 is pivoted around the hinge shafts 44 to adjust an angle $\theta$ to an optional value within a range from the point Y (upright) to the point X (horizontal) shown in FIG. 4. At this time, frictional force between each of the hinge shafts 44 and the corresponding spring 45 is required to be larger than the maximum moment applied to the hinge shaft 44. This requirement is attained by increasing a deflection quantity of the spring 45 to increase force to the tighten the corresponding hinge shaft 44.

Figure 6:
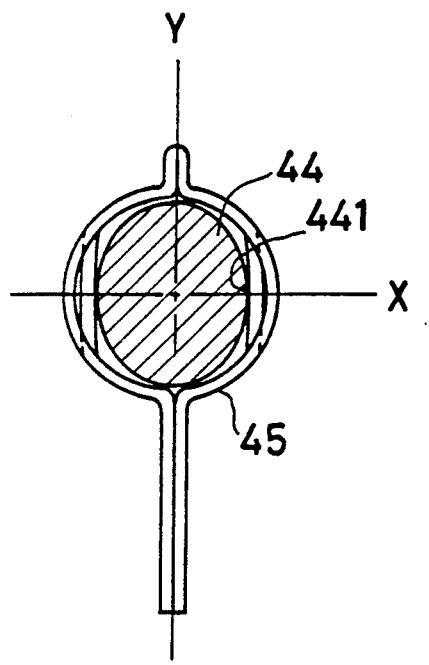
FIGS. 6 and 7 are enlarged sections showing a hinge shaft portion of the electronic apparatus shown in FIG. 3.
Figure 7:
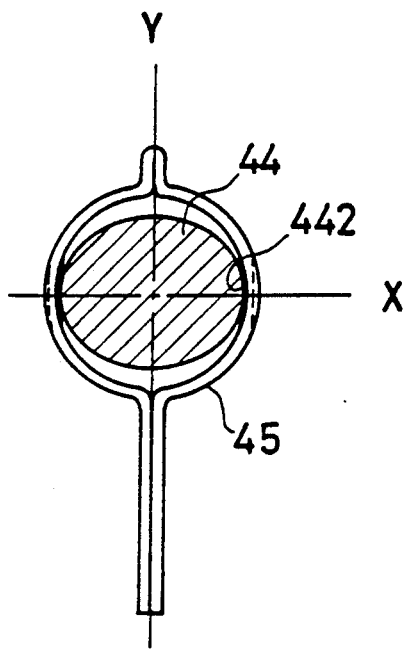

As shown in FIGS. 6 and 7, each of the hinge shafts 44 according to the present invention has an elliptic section at least at a portion engaging with the corresponding presser spring 45. Therefore, when the display portion 3 is at the point Y at which a moment is zeroed, the presser spring 45 contacts a minor diametral portion 441 of the corresponding hinge shaft 44 (FIG. 6), and, when the display portion 3 is at the point X at which the moment is maximized, the presser spring 45 contacts a major diametral portion 442 of the hinge shaft 44 (FIG. 7).

Therefore, when the moment is zeroed (upright), a deflection quantity of the presser spring 45 is small to minimize frictional force between the hinge shaft 44 and the presser spring 45. When the moment is maximized (horizontal), the deflection quantity of the presser spring 45 is large to maximize the frictional force between the hinge shaft 44 and the presser spring 45. Accordingly, an operator can adjust the display portion 3 to an optional angle with constant force.

For the display portion 3 of the present invention, not only the liquid crystal display but also a flat display such as a plasma display and an electroluminescence (EL) display may be used.

Further, the opening and closing mechanism for the display portion 3 according to the present invention is applicable also for a sheet suppressing door of a copy machine, etc.

As described in the above, in a portable electronic apparatus according to the present invention, a hinge shaft of a hinge portion has an elliptic section at least at a portion contacting a presser spring so that, when a display portion is brought to an upright position at which a moment is zeroed, a minor diametral portion of the hinge shaft contacts the presser spring to reduce a deflection quantity of the presser spring, and( when the display portion is brought to a horizontal position at which the moment is maximized, a major diametral portion of the hinge shaft contacts the presser spring to increase the deflection quantity of the presser spring. In this way, the deflection quantity of the presser spring can automatically be adjusted.

Therefore, an angle of the display portion can be adjusted by an operator with constant force so that an excellent operability may be realized.

Further, in the portable electronic apparatus of the present invention, force to be applied to a boss portion of a hinge base is constant and weaker than that applied to a conventional apparatus so that creep, etc., may not be caused on the hinge portion, and durability and reliability thereof may be improved.

Various modifications will become possible for those skilled in the art after reviewing the teachings of the present disclosure without departing from the scope thereof.

What is claimed is:

1. In a portable electronic apparatus having a body portion and a display portion, a hinge mechanism for connecting said display portion to said body portion such that said display portion is capable of being folded down and pulled up with respect to said body portion, said hinge mechanism comprising:
   a hinge member whose lower portion is pivotably jointed to said body portion;
   a hinge shaft fixed to one of an upper part of said hinge member and a lower part of said display portion, said hinge shaft having an oval cross section; and
   a presser spring fixed to another of said upper part of said hinge member and said lower part of said display portion so as to be pivotably engaged with said hinge shaft;
   said presser spring and said hinge shaft being engaged with each other such that a minor diametral portion of said hinge shaft contacts said presser spring when said display portion is brought to an upright position, and, when said display portion is brought to a horizontal position, a major diametral portion of said hinge shaft contacts said presser spring.

2. A hinge mechanism as claimed in claim 1, wherein said presser spring and said hinge shaft are engaged with each other such that frictional force between said presser spring and said hinge shaft is minimized when said display portion is brought to said upright position, and, when said display portion is brought to said horizontal position, said frictional force between said presser spring and said hinge shaft is minimized.

3. A hinge mechanism as claimed in claim 1, wherein said hinge shaft is fixed to said lower part of said display portion, and said presser spring is fixed to said upper part of said hinge member.

4. A hinge mechanism as claimed in claim 1, wherein a lower part of said hinge member is pivotably supported by said body portion through a torsion bar.

5. In a portable electronic apparatus having a body portion and a display portion, a hinge mechanism for connecting said display portion to said body portion such that said display portion is capable of being folded down and pulled up with respect to said body portion, said hinge mechanism comprising:
   a hinge member;
   a torsion bar for pivotably supporting a lower part of said hinge member with respect to said body portion; and
   a hinge shaft for pivotably supporting said display portion with respect to said hinge member.

6. A hinge mechanism as claimed in claim 5, wherein said hinge shaft is fixed to a lower part of said display portion and has an oral sectional shape, and wherein a presser spring is fixed to an upper part of said hinge member such that said presser spring pivotably engages with said hinge shaft.

7. A hinge mechanism as claimed in claim 6, wherein said presser spring and said hinge shaft are engaged with each other such that frictional force between said presser spring and said hinge shaft is minimized when said display portion is brought to an upright position, and, when said display portion is brought to a horizontal position, the frictional force between said presser spring and said hinge shaft is maximized.

8. A hinge mechanism as claimed in claim 6, wherein said hinge shaft is fixed to said upper part of said hinge member, and said presser spring is fixed to said lower part of said display portion.

9. A hinge mechanism for pivotably mounting a display on an electronic device, said hinge mechanism comprising:
   a hinge shaft having an oral cross section and fixed to one of said display and said electronic device;
   a presser spring having a pair of resilient parts opposite each other and resiliently supporting said hinge shaft between said pair of resilient parts such that said resilient parts make contact with said hinge shaft at surface portions which do not change irrespective of the relative position of said hinge shaft to said resilient parts, said resilient parts applying pressure to said hinge shaft in opposite directions, wherein frictional force associated with rotation of said hinge shaft relative to said presser spring is substantially determined by pressure between said resilient parts and said hinge shaft, and
   wherein said hinge mechanism is arranged such that when said display is in an upright position said surface portions of said resilient parts are aligned on the long axis of said oval cross section of said hinge shaft.

10. A hinge mechanism as claimed in claim 9, wherein said presser spring and said hinge shaft are engaged with each other such that frictional force between said presser spring and said hinge shaft is minimized when said display is brought to said upright position, and, when said display is brought to a horizontal position, frictional force between said presser spring and said hinge shaft is maximized.

11. A hinge mechanism as claimed in claim 9, wherein said hinge shaft is fixed to a lower part of said display, and said presser spring is fixed to an upper part of a hinge member.

12. A hinge mechanism as claimed in claim 9, wherein a lower part of a hinge member, connected to said electronic device, is piovtably supported by a body portion of said electronic device utilizing a torsion bar.

13. A hinge mechanism as claimed in claim 9, wherein said hinge shaft is fixed to a lower part of said display and wherein said presser spring is fixed to an upper part of a hinge member, connected to said electronic device, such that said presser spring pivotably engages with said hinge shaft.

14. A hinge mechanism as claimed in claim 9, wherein said hinge shaft is fixed to an upper part of said hinge member, and said presser spring is fixed to a lower part of said display.

15. A hinge mechanism as claimed in claim 13, wherein said presser spring and said hinge shaft are engaged with each other such that frictional force between said presser spring and said hinge shaft is minimized when said display is brought to said upright position, and, when said display is brought to a horizontal position, frictional force between said presser spring and said hinge shaft is maximized.

* * * * *